United States Patent
Senarath et al.

(10) Patent No.: US 9,537,971 B2
(45) Date of Patent: Jan. 3, 2017

(54) SYSTEMS, DEVICES AND METHODS FOR DISTRIBUTED CONTENT PRE-FETCHING IN MOBILE COMMUNICATION NETWORKS

(71) Applicant: HUAWEI TECHNOLOGIES CO., LTD., Shenzhen (CN)

(72) Inventors: Nimal Gamini Senarath, Ottawa (CA); Alex Stephenne, Stittsville (CA); Philippe Leroux, Vanier (CA); Aaron Callard, Ottawa (CA); Mehdi Arashmid Akhavain Mohammadi, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/608,908

(22) Filed: Jan. 29, 2015

(65) Prior Publication Data

US 2016/0226995 A1    Aug. 4, 2016

(51) Int. Cl.
*H04W 36/00* (2009.01)
*H04L 29/08* (2006.01)
*H04W 4/02* (2009.01)

(52) U.S. Cl.
CPC ........ *H04L 67/2847* (2013.01); *H04L 67/04* (2013.01); *H04L 67/327* (2013.01); *H04W 4/021* (2013.01); *H04W 4/028* (2013.01)

(58) Field of Classification Search
CPC .... H04L 67/2847; H04L 67/04; H04L 67/327; H04W 4/021; H04W 4/028

(Continued)

(56) References Cited

U.S. PATENT DOCUMENTS 6,125,278 A * 9/2000 Wieczorek ............ H04W 28/26
                                                            455/437
6,959,320 B2 * 10/2005 Shah ........................ G06F 8/65
                                                            709/203

(Continued)

FOREIGN PATENT DOCUMENTS

CN       1311961 A      9/2001
CN     104125606 A     10/2014
WO    2014140526 A1     9/2014

OTHER PUBLICATIONS

Dimitrios Lymberopoulos, Peixiang Zhao, Arnd Christian Konig, Klaus Berberich, and Jie Liu, Location-aware Click Prediction in Mobile local Search, in Conference in Information and Knowledge Management (CIKM), ACM, 2011.

(Continued)

*Primary Examiner* — Marceau Milord
(74) *Attorney, Agent, or Firm* — Norton Rose Fulbright Canada LLP

(57) ABSTRACT

There are disclosed systems, devices, and methods for distributing pre-fetch data. A parent node obtains pre-fetch data comprising at least one of: i) data expected to be of interest to a particular user, pre-fetched by the parent node from at least one data source; and (ii) at least one identifier identifying data expected to be of interest to the particular user, for pre-fetching the identified data at a child node. The parent node selects first and second subsets of the pre-fetch data for transmission, respectively, to first and second child nodes, the selecting based on at least a predicted future location of the particular user and a respective geographic location of the first and second child nodes; and transmits the first and second subsets of the pre-fetch data, respectively, to the first and second child nodes.

26 Claims, 9 Drawing Sheets

(58) Field of Classification Search
USPC .......................................... 455/436, 437, 442
See application file for complete search history.

(56) References Cited

U.S. PATENT DOCUMENTS

| | | | | |
|---|---|---|---|---|
| 7,043,524 | B2* | 5/2006 | Shah ................. | H04L 63/0281 707/999.009 |
| 7,912,458 | B2* | 3/2011 | Ramer ............. | G06F 17/30905 455/414.1 |
| 7,983,662 | B1* | 7/2011 | Ramer ............. | G06F 17/30905 455/411 |
| 8,972,467 | B2* | 3/2015 | Heinrich ............. | H04L 67/1095 345/661 |
| 9,131,472 | B2* | 9/2015 | Cheng ................. | H04W 74/02 |
| 9,294,214 | B2* | 3/2016 | Callard ............... | H04J 11/0056 |
| 2003/0065712 | A1* | 4/2003 | Cheung ................. | H04L 29/06 709/203 |
| 2014/0321344 | A1 | 10/2014 | Kore et al. | |
| 2016/0021508 | A1* | 1/2016 | Dunkin ............. | H04L 67/2847 701/518 |

OTHER PUBLICATIONS

Dimitrios Lymberopoulos, Oriana Riva, Karin Strauss, Akshay Mittal, and Alexandros Ntoulas, PocketWeb: Instant Web Browsing for Mobile Devices, in Architectural Support for Programming Languages and Operating Systems (ASPLOS 2012), ACM, Mar. 2012.

Emmanouil Koukoumidis, Dimitrios Lymberpoulos, Karin Strauss, Jie Liu, and Doug Burger, Pocket Cloudlets, in International Conference on Architectural Support for Programming Languages and Operating Systems (ASPLOS 2011), ACM, Mar. 2011.

JQuery Mobile Docs, Pre-fetching and caching pages, http://demos.jquerymobile.com/1.2.0/docs/pages/page-cache.html#/1.2.0/docs/pages/page-anatomy.html.

Parate, Abhinav et al., Practical Prediction and Prefetch for Faster Access to Applications on Mobile Phones, in ACM International Joint Conference on Pervasive and Ubiquitous Computing (UbiComp 2013), Sep. 2013.

Wu, Shiow-yang et al., Headlight Prefetching and Dynamic Chaining for Cooperative Media Streaming in Mobile Environments, IEEE Transactions on Mobile Computing, vol. 8, No. 2, Feb. 2009.

Ali, Waleed et al., A Survey of Web Caching and Prefetching, Int. J. Advance. Soft Comput. Appl., vol. 3, No. 1, Mar. 2011.

FollowThatPage: http://www.followthatpage.com/.

Change Detection: http://www.changedetection.com/.

Sills, Vasilios A. et al., Improving Mobile Video Streaming with Mobility Prediction and Prefetching in Integrated Cellular-WiFi Networks, Lecture Notes of the Institute for Computer Sciences, Social Informatics and Telecommunications Engineering vol. 131, 2014, pp. 699-704.

Deshpande, Pralhad et al., Predictive Methods for Improved Vehicular WiFi Access, Proceedings of the 7th international conference on Mobile systems, applications, and services (MobiSys '09), ACM, Jun. 2009.

SIPO of the P.R. China; International Search Report and Written Opinion issued in corresponding International Application No. PCT/IB2015/058796 dated Feb. 18, 2016; 11 pages.

\* cited by examiner

SYSTEMS, DEVICES AND METHODS FOR DISTRIBUTED CONTENT PRE-FETCHING IN MOBILE COMMUNICATION NETWORKS

FIELD

This relates to data communications, and more particularly, to content pre-fetching in mobile communication networks.

BACKGROUND

In recent years, access to wireless data communication has proliferated. For example, coverage of mobile telecommunication networks (e.g., 3G, 4G, LTE, etc.) and WiFi networks has steadily expanded. This has created an expectation, in some users, of continuous and instant wireless connectivity, and being able to access content by way of wireless data communication at all times. However, despite advances in wireless data communication, many wireless and backhaul access links are unreliable, low-rate, or high latency, and many coverage gaps still exist. As a result, users may fail to obtain content data when desired.

Pre-fetching of content data has been employed to improve Quality of Experience in various aspects. For example, content data may be pre-fetched from remote content data sources to access points proximate a mobile device user. However, when the mobile device user moves out of range of that access point, a second access point must take over pre-fetching responsibilities. The second access point must pre-fetch content data from the remote content data sources. However, if the links between the second access point and the remote content data sources are unreliable or low-rate, then the content data may not be retrieved in time.

Accordingly, there exists a need for systems, devices, and methods that address at least some of the above-noted shortcomings.

SUMMARY

In accordance with an aspect, there is provided a method at a parent node for distributing pre-fetch data to at least two child nodes. The method includes: obtaining pre-fetch data comprising at least one of: (i) data expected to be of interest to a particular user, pre-fetched by the parent node from at least one data source by way of at least one data network; and (ii) at least one identifier identifying data expected to be of interest to the particular user, for pre-fetching the identified data at least one of the child nodes; selecting a first subset and a second subset of the pre-fetch data for transmission, respectively, to a first child node and a second child node of the at least two child nodes, the selecting based on at least a predicted future location of the particular user and a respective geographic location of the first and second child nodes; and transmitting the first subset and the second subset of the pre-fetch data, respectively, to the first child node and the second child node by way of the at least one data network.

In accordance with another aspect, there is provided a network node for distributing pre-fetch data. The node includes: a network interface for interconnection with at least two child nodes by at least one data network; and at least one processor in communication with the network interface. The at least one processor is configured to: obtain pre-fetch data comprising at least one of: (i) data expected to be of interest to a particular user, pre-fetched by the network node from at least one data source by way of the network interface; and (ii) at least one identifier identifying data expected to be of interest to the particular user, for pre-fetching the identified data at least one of the child nodes; select a first subset and a second subset of the pre-fetch data for transmission, respectively, to a first child node and a second child node of the at least two child nodes, the selecting based on at least a predicted future location of the particular user and a respective geographic location of the first and second child nodes; and transmit, by way of the network interface, the first subset and the second subset of the pre-fetch data, respectively, to the first child node and the second child node.

Many further features and combinations thereof concerning the present improvements will appear to those skilled in the art following a reading of the instant disclosure.

DESCRIPTION OF THE FIGURES

In the figures.

These drawings depict example embodiments for illustrative purposes, and variations, alternative configurations, alternative components and modifications may be made to the disclosed embodiments.

DETAILED DESCRIPTION

Figure 1:
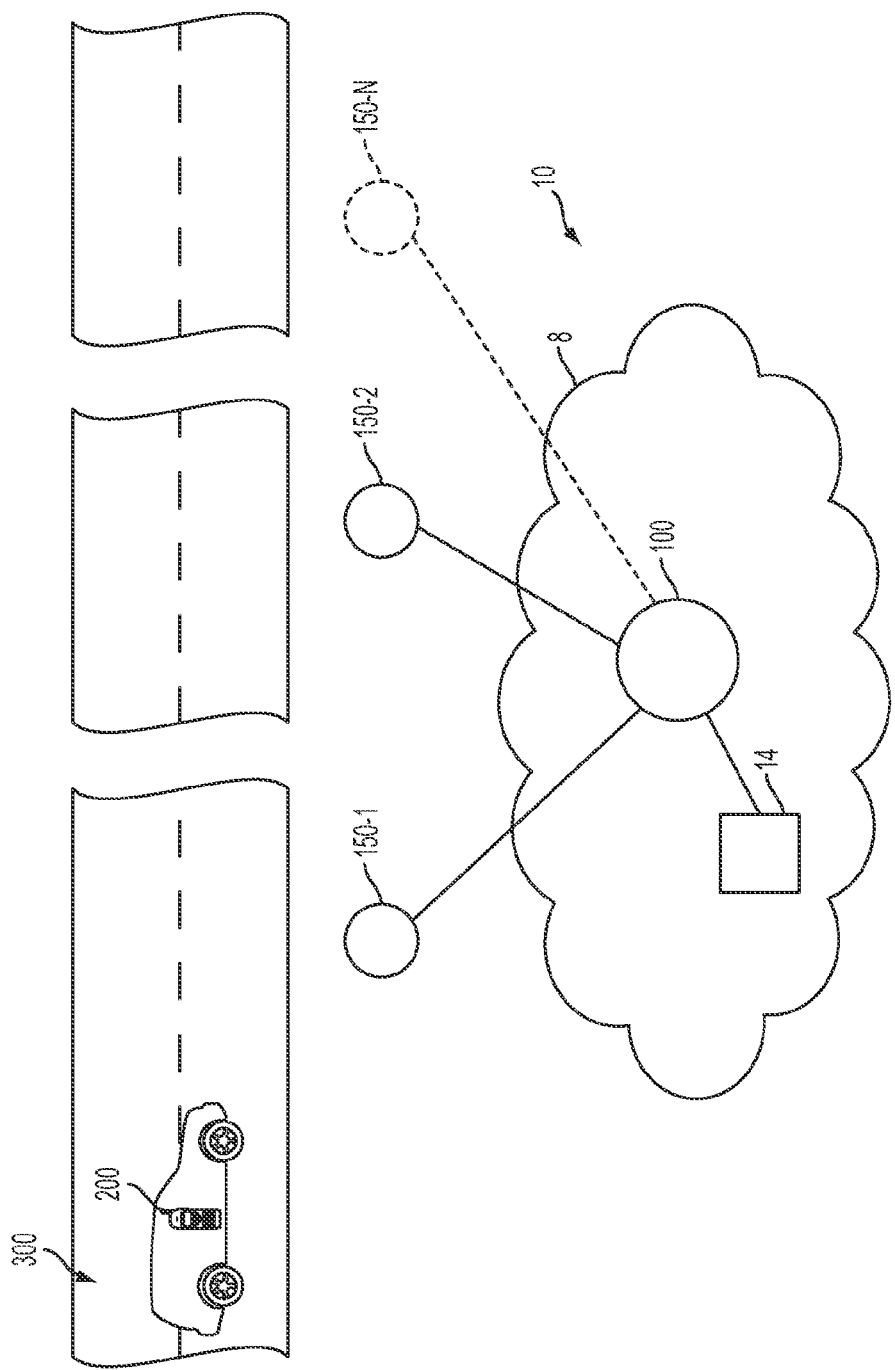
FIG. 1 is a schematic diagram of a data communication system including root nodes and child nodes, according to an embodiment.

FIG. 1 illustrates a data communication system 10 that performs per-user content pre-fetching.

System 10 performs content pre-fetching using a distributed set of nodes interconnected by one or more data communication networks. The set of nodes includes nodes distributed geographically at locations proximate predicted future locations of a particular user. For example, the set of nodes may include nodes located along a travel route predicted for a particular user.

In an aspect, multiple nodes may each perform user mobility prediction, and nodes closer to the user may produce more accurate or more timely predictions, as detailed below. Such predictions may be shared amongst the nodes, e.g., to provide pre-fetched data at a location proximate to a predicted future location of the user.

In an aspect, these nodes cooperate in manners detailed herein to perform content pre-fetching, and to distribute pre-fetched content data amongst the nodes such that at least a portion of content data is available at a node proximate the user as the user moves from location to location. The pre-fetched content data made available at each node may be tailored to suit a predicted situation of the user when proximate that node, e.g., activities being performed, applications being executed, etc.

Distributing pre-fetched content data to nodes proximate predicted future locations for a particular user facilitates ready access by the user's mobile device to at least some of the content data, even when the device's network connectivity may be limited, e.g., when the links to content data sources may be unreliable or low-rate.

The pre-fetched content data may be transmitted from one of the distributed nodes to the particular user's mobile device for immediate or future consumption.

In another aspect, the nodes of system 10 may cooperate in manners detailed herein to perform per-user content interest prediction to identify content data expected to be of interest to particular mobile device users, and to distribute a list including one or more identifiers of the content data expected to be of interest to a particular user amongst the nodes such that at least parts of the list are available at a node proximate the user as the user moves from location to location. The content list data made available at each node may be tailored to suit a predicted situation of the user when proximate that node, e.g., activities being performed, applications being executed, etc.

In yet another aspect, the nodes of system 10 may cooperate in manners detailed herein to perform content discovery to find locations of content data identified in a content list. For example, multiple nodes may each search for a location of content data closest to that node. In this way, content data may be retrieved from a preferred location (e.g., a location close to the user, or a location having a lower access cost), which may vary as the user moves from location to location. For example, the nodes of system 10 may pre-fetch content data from such a preferred location, as found.

In the example embodiment depicted in FIG. 1, system 10 performs content pre-fetching for a particular user operating a mobile device 200 who is traveling along route 300. As depicted, system 10 includes a root node 100 interconnected with a plurality of child nodes, e.g., nodes 150-1, 150-2, 150-N, and so on, hereinafter referred to collectively as child nodes 150. Root node 100 is also interconnected with one or more content data sources 14.

As detailed herein, in an embodiment root node 100 pre-fetches content data from the one or more content data sources 14. Root node 100 then forwards the pre-fetched content data to particular child nodes proximate predicted future locations of the user. Mobile device 200 may then pre-fetch the data or retrieve the data when needed from those child nodes.

In an embodiment, a set of such nodes (e.g., root node 100 and child nodes 150) is instantiated for each particular user, to perform per-user content pre-fetching in manners detailed herein. In this embodiment, each set of nodes is dedicated to the particular user, and serves only that particular user.

Root node 100, child nodes 150, and content data sources 14 are interconnected by one or more data communication networks 8. Networks 8 may include packet-switched networks, circuit-switched networks, or a combination thereof. Networks 8 may include wired links, wireless links, or a combination thereof. Networks 8 may include wired access points and wireless access points. Networks 8 may include or be connected to the Internet.

In the depicted embodiment, root node 100 is located in the cloud, where it may be interconnected by communication links to one or more content data sources 14. The links between root node 100 and one or more of the content data sources 14 may have deficiencies such as, for example, low data rate, high latency, etc. Further, content data sources 14 may require authorization to access the desired content.

Conveniently, pre-fetching according to the depicted embodiment may improve Quality of Experience for the user, and particularly in the presence of such link deficiencies. Further, pre-fetching in combination with pre-authorization as described below for the depicted embodiment may allow certain delays associated with establishing authorized connections to be avoided.

Root node 100 maintains a content list for the particular user. The content list includes a plurality of entries, each identifying a content item expected to be of interest to the user. Root node 100 may populate the content list, for example, based on content interests predicted for the particular user. Root node 100 may also populate the content list, for example, based on content interests expressed by the particular user or indicated by an application executing at the user's mobile device 200. Root node 100 updates the list as new content interest predictions are made, and new content interests are received.

Root node 100 may pre-fetch content data according to content identified in this content list. Root node 100 may assign priorities to portions of content data, for example, based on a user mobility prediction, a likelihood that the user will access the content data at a particular location, e.g., from a particular child node, etc. Conveniently, in some cases, assigning priorities to portions of the content data, and distributing portions of the content data according to those priorities, improves the utilization of network resources. For example, high priority content data may be pre-fetched at a node first, to make that content data available to the user in the face of network congestion, link deficiencies, or storage limitations at a node or at mobile device 200.

In an embodiment, device 200 maintains its own content list, and root node 100 and device 100 synchronize their respective content lists. Root node 100 transmits content list updates to device 200, and receives content list updates from device 200. Such updates may be transmitted directly to device 200, by way of child nodes 150, or through networks other than networks 8.

Child nodes 150 are established at locations proximate predicted future locations of a particular user. In the example embodiment depicted in FIG. 1, the locations of child nodes 150 are selected to be along a predicted travel route 300 of the user. In this embodiment, the user is expected to be proximate child node 150-1 at time $T_1$, proximate child node 150-2 at time $T_2$, proximate child node 150-N at time $T_N$, and so on. A child node 150 may, for example, be established at an edge of a wireless networks with which device 200 has connectivity at a particular point in time.

In the depicted embodiment, child nodes 150 are instantiated by system 10 at desired locations proximate the predicted future locations of the user. For example, a root node 100 may cause a new child node 150 to be instantiated by selecting a desired location for the new node, and then transmitting a request to a device at the selected geographic location to function as the new node. Child nodes 150 may be instantiated as predictions of the future locations become available, and prior to the user's arrival at those locations. For example, child node 150-N (shown in dotted lines) may not exist at time $T_1$, but may be instantiated by system 10 at $T_{N-1}$. System 10 may remove any of child nodes 150 once it is no longer required, e.g., once a user has traveled out of the range of the child node 150, or if the predicted future locations are determined to be incorrect. For example, a root node 100 may cause a child node 150 to be removed by transmitting a request to a device to cease functioning as the child node 150. Thus, each of child nodes 150 may exist only temporarily. In this way, child nodes 150 may be instantiated to service a geographical area that varies according to a particular user's location. For example, this geographical area may migrate with the particular user as that user moves from location to location.

In another embodiment, a plurality of child nodes 150 may be provided at a plurality of locations, e.g., to span a geographic area, before any predictions of a user's future location are made.

Child nodes 150 may be located in different wireless networks, e.g., in different jurisdictions, operated by different service providers, or configured to communicate with mobile devices by way of different Radio Access Technology (RAT), e.g., WiFi, 3G, 4G, LTE, etc.

Each child node 150 may maintain its own content list. The content list maintained at a child node 150 may be a subset of the content list maintained at root node 100 or at device 200. The subset is selected based on content expected to be of interest to the user when the user is proximate a respective child node 150.

Each child node 150 may store pre-fetched content data for future transmission to mobile device 200. The pre-fetched content data stored at a child node 150 may include data pre-fetched at root node 100 and received therefrom. The pre-fetched content data stored at a child node 150 may also include data pre-fetched at that child node 150. Each child node 150 may pre-fetch content according to content identified in its own content list. Each child node 150 may also pre-fetch content upon receiving a request, for example, from root node 100 or mobile device 200.

The pre-fetched content data stored at each child node 150 is data expected to be needed at mobile device 200 when the user is proximate that child node 150. So, for example, the pre-fetched content data stored at child node 150-1 may include content data expected to be needed at mobile device 200 at time $T_1$; the pre-fetched content data stored at child node 150-2 may include content data expected to be needed at mobile device 200 at time $T_2$; the pre-fetched content data stored at child node 150-N may include content data expected to be needed at mobile device 200 at time $T_N$, and so on. The content data expected to be needed at mobile device 200 at a particular time are determined based on predictions of the user's situation at that time, e.g., location, activities being performed, applications being executed, etc., as detailed below.

Conveniently, in the depicted embodiment, because the pre-fetched content data stored at each of child nodes 150-1 and 150-2 may be controlled and allocated by root node 100, content data may be supplied to mobile device 200 without user perceivable interruption as the user moves out of the range of child node 150-1 and into the range of child node 150-2.

In the absence of control provided by root node 100 in manners described herein, data may be pre-fetched (e.g., at multiple nodes) unnecessarily. For example, in one example conventional system, when a user moves from a first access point to a second access point, all of the pre-fetched content stored at the first access point may need to be downloaded again at the second access point.

Further, in the depicted embodiment, even though child nodes 150-1 and 150-2 may be in two different wireless networks, pre-fetched content data may be provided without user perceivable interruption to mobile device 200 even when the device transitions from one wireless network to another. Similarly, even though child nodes 150-1 and 150-2 may use different RAT, pre-fetched content data may be provided to mobile device 200 without user perceivable interruption even when the device transitions from one RAT to another.

Mobile device 200 may be a mobile phone or any other type of mobile device (e.g., a tablet computer or a laptop computer). Device 200 includes one or more communication interfaces allowing the device to access data communication networks by way of one more RAT.

Mobile device 200 communicates with one or more of child nodes 150, e.g., to receive pre-fetched content data from a child node 150. In an embodiment, device 200 communicates with child nodes 150 directly. In another embodiment, device 200 communicates with child nodes 150 indirectly, e.g., by way of wireless access points.

As noted, in an embodiment, device 200 maintains its own content list. Device 200 may perform content interest prediction and update its content list accordingly. Device 200 may also receive content requests from the user and update its content list accordingly. Device 200 synchronizes its content list with the content list at root node 100 by exchanging content list updates. Such updates may be transmitted to root node 100 directly, or by way of child nodes 150, or through networks other than networks 8.

Figure 2:
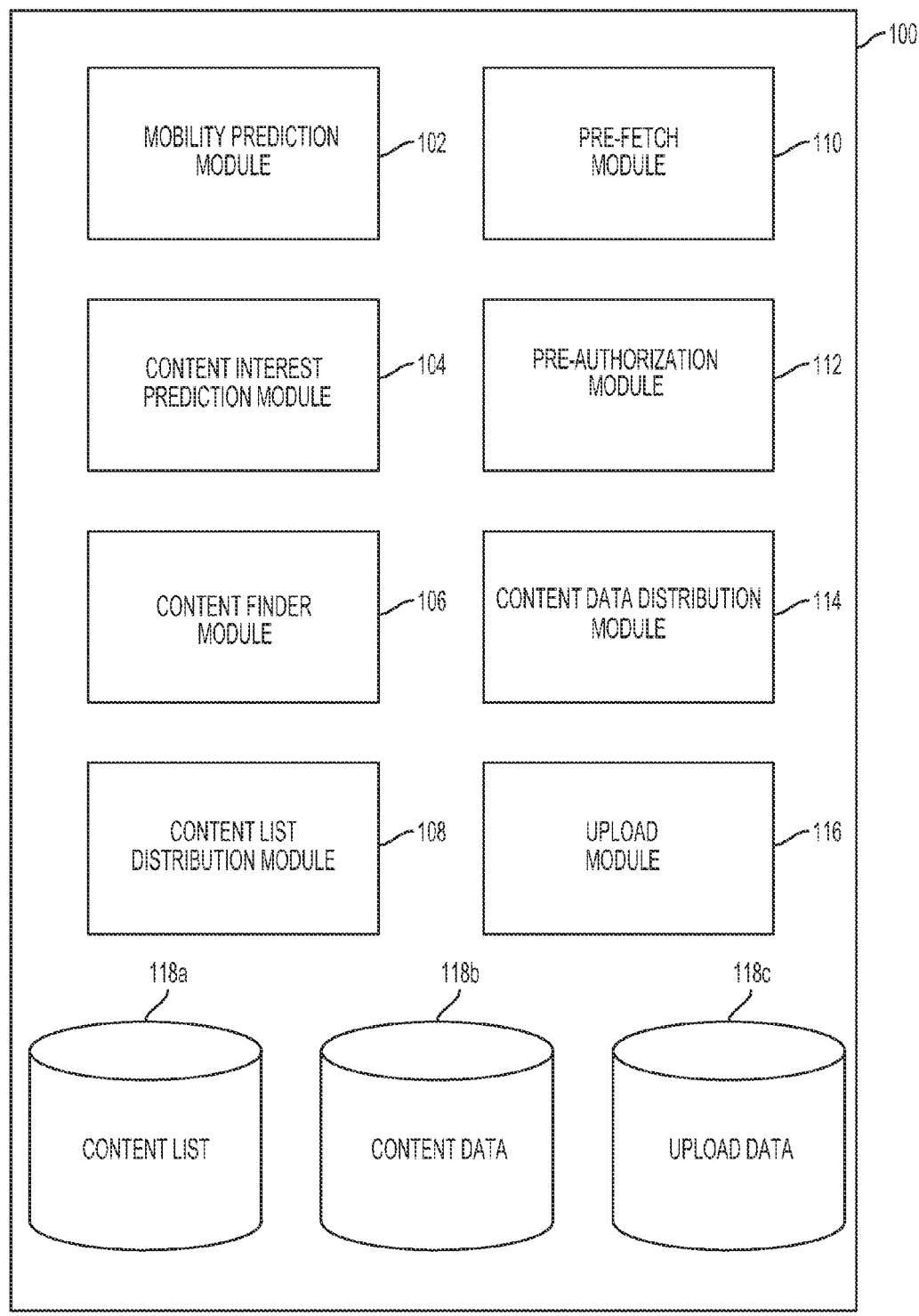
FIG. 2 is a high-level block diagram of the root node of FIG. 1, according to an embodiment.

FIG. 2 provides a high-level block diagram of root node 100. As depicted, node 100 includes a mobility prediction module 102, a content interest prediction module 104, a content finder module 106, a content list distribution module 108, a pre-fetch module 110, a pre-authorization module 112, a content data distribution module 114, and an upload module 116.

Mobility prediction module 102 is configured to perform mobility prediction for a particular user. For example, mobility prediction module 102 may process a variety of data to predict a user's location at particular future points in times (e.g., at times $T_1$, $T_2$, . . . $T_N$). Mobility prediction module 102 may predict a user's future locations, for example, by processing data reflective of the user's current location, trajectory, speed, as may be obtained from onboard sensors (e.g., a GPS sensor) of a mobile device 200 and transmitted therefrom to root node 100, and data reflective of possible travel routes, e.g., road maps obtained from an online mapping service. In an embodiment, mobility prediction module 102 may also process data reflective of a user's travel plans, e.g., as obtained from a route planning application executing at a device 200, or from a server of a travel agency, an airline, or the like.

In an embodiment, mobility prediction module 102 may be configured to predict other aspects of a user's situation at particular future points in time including, for example, an activity that will be performed by the user, an application that will be executed at the user's device 200, etc.

Mobility prediction module 102 may predict aspects of a user's situation based on, e.g., the user's predicted location. So, for example, mobility prediction module 102 may predict that a particular user will be working, shopping, commuting, at home, etc., based on the user's predicted locations. Mobility prediction module 102 may predict aspects of a user's situation based on, e.g., the time of day, the day of the week, to determine whether a future time period falls within working hours.

Mobility prediction module 102 may also predict aspects of a user's situation based on data reflective of the user's current activities, or current applications being executed at the user's mobile device. In one specific example, mobility prediction module 102 may determine that a user will likely be watching a streaming video in five minutes based on data indicating that the user is currently watching the video and the video has one hour remaining, as may be determined from an video application executing at device 200. In another specific example, mobility prediction module 102 may determine that a user will likely be listening to music in two minutes based on data indicating that the user is currently jogging, e.g., as may be determined from onboard sensors (e.g., gyroscope) of device 200, and based on historical data indicating that the user typically listens to music when jogging.

Mobility prediction module 102 may also predict aspects of a user's situation based on locations of other users, e.g., to determine when the user is in a crowd. For example, mobility prediction module 102 may determine a user's situation based on determining a common activity of the crowd, e.g., that the user is attending a concert, queuing at a supermarket, etc. This common activity may be determined, for example, from content being accessed by other members in the crowd. This common activity may be used to identify content of interest to the user, to prioritize content of interest, etc.

In an embodiment, mobility prediction module 102 may implement one or more conventional mobility prediction algorithms. In an embodiment, mobility prediction module 102 may predict a user future's situation using a statistical model such as, e.g., a hidden Markov model, which may be trained using population data or user-specific data.

Content interest prediction module 104 is configured to perform content interest prediction to identify content items expected to be of interest to a particular user. Content interest prediction module 104 may perform content interest prediction by processing data reflective of a user's past content consumption (e.g., browsing history, history of viewed videos), or data reflective of a user's current content consumption (e.g., searches being conducted, articles being read). Content interest prediction module 104 may perform content interest prediction by processing data reflective of data consumption behavior of a population of users, e.g., other users of networks 8. In this way, popular or trending content may be identified as being of interest to a particular user.

In an embodiment, content interest prediction module 104 may take into account data reflecting the situations of other users in the population of users, to more heavily weigh data consumption behavior of other users in situations similar to the user's predicted future situations. Content interest prediction module 104 may also group users by demographic characteristics and more heavily weigh data from users having similar demographic characteristics.

Content items may include any type of content data that a user might access in the future. Content items may include publically-available data, e.g., webpages, YouTube™ videos, or the like. Content items may also include private secured-access data, e.g., incoming e-mails, or Dropbox™ files, etc. Access to private data may be facilitated by pre-authorization module 112, as described below.

Content items of interest to the user may also include types of content data that are used by device 200 or an application executing at mobile device 200. The user of device 200 may not be aware of exchange or use of such content data. For example, content items may include DNS translations of hostnames to IP addresses, as may be used by applications executing at device 200.

Content items may be identified at a high-level of generality, e.g., news, baseball, etc. Content items may be also identified more precisely, e.g., a particular URL, a particular keyword, a particular webpage, a particular document, or a particular video, etc. Content items may be predicted even more precisely, e.g., a particular portion of a document that has changed since the user last accessed the document, or a particular segment of a video, etc.

Content interest prediction may be performed based on historical data reflective of a user's content consumption spanning a long period of time, e.g., days, weeks, months, etc. In one specific example, content interest prediction module 104 may predict that a user is interested in weather forecasts for a particular city based on data showing that the user has consistently retrieved such forecasts over a period of time.

Content interest prediction may also be performed based on real-time or near real-time data, e.g., a user's activity in the last few minutes or seconds. In one specific example, content interest prediction module 104 may predict that a user is interested in a particular segment of a video based on data showing that the user is currently watching a preceding segment of that video.

Content interest prediction may take into account the user's predicted situation, as may be provided by mobility prediction module 102. For example, content interests may be predicted based on the user's location, activity, whether the user is at work or at home, weather conditions at the user's location, etc.

In one specific example, a user at work receives an alarm indicating an alarm condition at her home (e.g., a washing machine leak), and begins traveling home to deal with the alarm condition. In this example, mobility prediction module 102 may receive data indicating the alarm condition, and indicating that the user is traveling on a route towards home. On this basis of this data, mobility prediction module 104 may predict the user's situation, e.g., that the user is returning home to fix her washing machine. Content interest prediction module 104 may use this predicted situation to predict content items expected to be of interest to the user upon returning home, e.g., content items relating to alarm information, repair information, safety information, mechanic contact information, all of which may be assigned high priority given the urgency of the situation. These content items may then be transmitted to a child node 150 proximate the user's home.

The user's predicted situation may also include status information of the user's device, e.g., device state, battery level, programs running, commands received, etc.

Content interest prediction may also be performed based on information regarding other users who may be associated with the other user, e.g., friends, family, etc. In an embodiment, content interest prediction module 104 may obtain information regarding such other users by way of the particular user's contact list, which may be retrieved from mobile device 200 or a remote server, e.g., a social media platform.

Content interest prediction module 104 may obtain various data relating to such other users including, for example, historical data indicating content accessed by such other users, real-time or near real-time data indicating content being accessed by such other users, real-time or near real-time data indicating a current situation (e.g., location, activity, etc.) of such other users. In an embodiment, content interest prediction module 104 may receive such data from a node in system 10 instantiated for one of the other users.

In one specific example, content interest prediction module 104 adds a particular video to the user's content list upon determining that a friend or family member of the user has accessed that video.

Content interest prediction module 104 may assess a degree of affinity between the particular user and particular other users, and weigh behavior data of other users based on the degree of affinity. The degree of affinity may be determined from data regarding frequency of contact, shared interest, shared demographics, or the like.

In an embodiment, content interest prediction module 104 may receive notifications from one or more content data sources that updated content data is available, e.g., that content data previously-accessed by the user or previously pre-fetched for the user has been updated. In such cases, content interest prediction module 104 may assess whether the updated content data is expected to be of interest to the user. If so, the updated content data may be added to the content list, and may be pre-fetched by pre-fetch module 110 in manners detailed below. The updated content data may also be pre-fetched by a child node 150, e.g., upon receiving a portion of the content list from root node 100. In an embodiment, root node 100 may send a notification to one or more child nodes 150 that the updated content data is available. In an embodiment, root node 100 may transmit a request to one or more child nodes to pre-fetch the updated content data.

In an embodiment, content interest predictions module 104 may receive content interest predictions from one or more trusted entities, and such content interest predictions may be added to the node's content list without scrutiny.

Content interest prediction module 104 generates a content list having entries identifying content items expected to be of interest to the user. Content interest prediction module 104 maintains this content list in a data store 118a. Content interest prediction module 104 updates this content list in data store 118a as new content interest predictions are made. Content interest prediction module 104 also updates the content list in data store 118a as content list updates are received from other nodes, from the user's mobile device 200, or from other entities.

Content finder module 106 is adapted to perform content discovery by searching for locations of content items, as may be provided by content interest prediction module 104. For example, content finder module 106 may search for content items by scanning various content data sources; content finder module 106 may also search for content in local caches and caches in interconnected nodes, e.g., caching nodes.

Content finder module 106 updates the content list in data store 118a to include locations of content items, as found. In some cases, multiple locations for the same content may be found, and each location may be stored in the content list in data store 118a.

Content finder module 106 may also include in the content list an indicator of whether authorization is required to access the content, e.g., when the content item is a bank statement. Content finder module 106 may also include in the content list an indicator of whether payment is required to access the content, e.g., when the content item is behind a paywall. Content finder module 106 may also include in the content list an indicator of network transmission characteristics associated with a particular location, e.g., latency, delay of access, data rate, cost, etc. The cost may, for example, be a network cost or a monetary cost.

Content list distribution module 108 is configured to distribute content list data to child nodes 150. Content list distribution module 108 processes a list of content items predicted to be of interest to the user, e.g., as stored in data store 118a, to assign priorities to identified content items. Priorities may be determined based on the predicted future locations of the user. For example, for a predicted location, content list distribution module 108 may estimate a likelihood (e.g., calculate a numerical likelihood) that the user will be interested in each content item and generate predictions of when (e.g., short term, long term, within time $T_1$, between $T_1$ and $T_2$, between $T_2$ and $T_3$) the user will be interested in each content item.

In an embodiment, the priorities for content items may be determined based on other aspects of a user's predicted situation, e.g., activities that will be performed, applications that will be executed, etc.

In an embodiment, the priorities for content items may be determined based on network transmission characteristics associated with the locations of content items, noted above. In an embodiment, the priorities for content items may be determined based a cost of accessing those content items, which may be, e.g., a monetary cost or a network cost.

Content list distribution module 108 selects a subset of the list of content items for transmitting to at least one of the child nodes 150. The subset may be selected based on the determined priorities, a predicted future location of the particular user, and the geographic location of that child node 150. In an embodiment, the subset may be selected based on other aspects of a user's predicted situation, e.g., activities that will be performed, applications that will be executed, etc.

In an embodiment, content list distribution module 108 provides to each child node 150 the priority assigned to each content item transmitted to that child node 150.

In an embodiment, content list distribution module 108 maintains a record of previous content list data sent to each child node 150. In this embodiment, content finder module 106 sends content list updates reflecting new/updated content items.

In an embodiment, when a content item is available at multiple locations, as may be found by content finder module 106, content list distribution module 108 may determine a preferred location to retrieve that data, based on predictions of the user's future location/situation. The preferred location may be indicated as such in the content list among other alternate locations. In an embodiment, content list distribution module 108 may select a preferred location based on network transmission characteristics associated with a particular location (e.g., latency, delay of access, data rate, etc.).

In an embodiment, content list distribution module 108 may provide at least part of the content list to trusted entities. Such trusted entities may use the content list data to offer/push content items to the particular user. Such trusted entities may also assist in identifying preferred or alternate locations for retrieving the content items.

As noted, in an embodiment, mobile device 200 may maintain its own content list. In this embodiment, content list distribution module 108 also sends content list updates to mobile device 200 so that mobile device 200 may maintain its contact list in synchrony with the contact list at root node 100.

Referring again to FIG. 2, pre-fetch module 110 is configured to pre-fetch content data for a particular user. Pre-fetch module 100 may pre-fetch content data according to content items, locations and priorities in the content list described above, as updated by content interest prediction module 104, content finder module 106, and content list distribution module 108. In an embodiment, pre-fetch module 100 may use a different content list, which may be provided by an external entity. Pre-fetched content data may be stored at root node 100, e.g., in content data store 118b, for later transmission.

When multiple locations are available for pre-fetching the same content data, pre-fetch module 100 may select a preferred location, e.g., a location close to the user, or a low-cost location.

In an embodiment, pre-fetch module 110 keeps track of any changes in content items at a content data source, including availability of new content data. Such content items may be content items identified in the content list generated by content interest prediction module 104, or another content list. In this way, pre-fetch module 110 may keep the pre-fetched data at root node 100 synchronized with the data at the content data source.

In one example, pre-fetch module 110 may poll a content server from time to time to check for updates. Such polling may be conducted to a pre-set schedule, or may be conducted according to network resource availability (e.g., when there are low traffic conditions). In another example, a content server may notify pre-fetch module 110 of changes in content data. In some cases, changes may be automatically pushed to pre-fetch module 110, or changes may be retrieved by pre-fetch module 110 upon receiving notification. In some cases, pre-fetch module 110 may subscribe to receive such notifications. In another example, a content data source may provide a schedule of when content data is expected to change (e.g., when a new episode of a video program will be made available for download), and pre-fetch module 110 may retrieve the new content data according to the provided schedule.

In an embodiment, pre-fetch module 110 may pre-fetch content data from a content data source at a time based on a prediction of when the user will require that data. For example, if pre-fetch module 110 receives a prediction that a user will want to watch a particular video at a particular time, pre-fetch module 110 may pre-fetch data for that video at a time between when that video becomes available and the predicted viewing time. The particular time that the data is pre-fetched may depend on various factors including, for example, congestion of the network, e.g., link condition, costs, and the user's location.

Upon determining that particular content data has changed, pre-fetch module 110 may send a notification to one or more of child nodes 150. Pre-fetch module 110 may also send a notification to mobile device 200. In an embodiment, child nodes 150 and/or device 200 are notified immediately of such changes.

Upon receipt of such notifications, child nodes 150 and/or device 200 may optionally retrieve some or all of the changed content data. The content data may be retrieved from root node 100 or from the content data source.

In one specific example, device 200 may be configured to monitor temperatures at one or more locations (e.g., computer server rooms, food cold storage rooms, etc.), and to perform a pre-programmed action (e.g., raise an alarm) when a monitored temperature deviates from an expected range. Accordingly, device 200 may be configured to obtain temperature sensor data from a monitored location. Until that sensor data changes from its last pre-fetched state, there is no need to pre-fetch new data. When a change occurs, as may be determined according to any of the manners described above, device 200 may receive notification of the change. At that time, device 200 may pre-fetch the new sensor data.

In an embodiment, in lieu of pre-fetching certain content data for a content item, pre-fetch module 110 may transmit a request to a child node 150 to pre-fetch that content data at that child node 150. Pre-fetch module 110 may issue such a request, for example, when a content item is found at a location closer to that child node 150. The request may include an identifier of the content item to be pre-fetched. The identifier may include a location of the content item.

Pre-authorization module 112 is configured to establish connections with interconnected servers which require user/device authorization. Pre-authorization module 112 may maintain user or device credentials for such servers and present such credentials to establish authenticated connections. Content finder module 106 may use such authenticated connections to find content located at the interconnected servers. Pre-fetch module 110 may use such authenticated connections to pre-fetch data from the interconnected servers. Upload module 116 may use such authenticated connections to upload data to the interconnected servers, as detailed below.

In an embodiment, pre-authorization module 112 establishes an authorized connection with an interconnected server based on a predicted user need for the authorized connection, e.g., to download or upload data. In this way, delay associated with establishing such connections may be avoided when the authorized connection is needed.

In an embodiments, pre-authorization module 112 may be adapted to maintain the connection, e.g., by periodic transmission of keep-alive signals. In this way, a connection may be maintained on behalf of the user even if the user's mobile device 200 loses connectivity.

Content data distribution module 114 is configured to transmit pre-fetched content data. Pre-fetched content data may be retrieved from content data store 118b for transmission. Content data distribution module 114 may, for example, transmit parts of pre-fetched content to one or more child nodes 150. Such content data may be stored at a child node 150 until needed at the user's mobile device 200.

Content data distribution module 114 assigns priorities to parts of the pre-fetched content data. Priorities may be determined based on the predicted future locations of the user. For example, for a predicted location, content data distribution module 114 may estimate a likelihood (e.g., calculate a numerical likelihood) that the part of the pre-fetched content data will be needed at the user's mobile device 200, and when (e.g., how soon) that data will be needed (e.g., short term, long term, within time $T_1$, between $T_1$ and $T_2$, between $T_2$ and $T_3$).

In an embodiment, the priorities for parts of pre-fetched content data may be determined based on other aspects of a user's predicted situation, e.g., activities that will be performed, applications that will be executed, etc.

The particular part of the pre-fetched content data transmitted to each child node 150 may be based on the determined priorities, the location of the child node 150, the predicted location of the user, and the predicted content data needs of the user when at the predicted location. In an embodiment, the portion may be selected based on other aspects of a user's predicted situation, e.g., activities that will be performed, applications that will be executed, etc. In this way, pre-fetched content data is sent towards a location or locations proximate to where the user is expected to be when that data will be needed.

The particular part of the pre-fetched content data transmitted to each child node 150 may also be based on other factors including, for example, the quantity of the pre-fetched content data expected to be consumed at device 200 while proximate a particular child node 150, how soon content data will be needed at device 200, a cost or a metric of network conditions associated with data communication between the root node 100 and a particular child node 150, or a cost or a metric of network conditions associated with data communication between a particular child node 150 and device 200.

The particular part of the pre-fetched content data transmitted to each child node 150 may be also be based on the data transmission characteristics associated with that child node 150, e.g., transmission costs, data rate, capacity, latency, etc., as noted above. Such data transmission characteristics may be received from the child nodes 150, or from monitors residing in a network 8. The particular part of the pre-fetched content data transmitted to each child node 150 may also be based on the transmission preferences of the user, or of an application executing at the user's mobile device, as noted above.

The cost may, for example, be a monetary cost or a network cost associated with data communication with a particular child node 150. The metric of network conditions may, for example, reflect a data rate, latency, capacity, congestion state, or load of particular link(s) or nodes. The metric of network conditions may, for example, be a Quality of Experience metric associated with data communication with a particular child node 150.

In an embodiment, the particular part of the pre-fetched content data transmitted to each child node 150 may take into account other traffic being transmitted through networks 8, e.g., traffic generated by other users.

The particular part of the pre-fetched content data transmitted to each child node 150 may be based on a combination the factors noted above.

Figure 3:
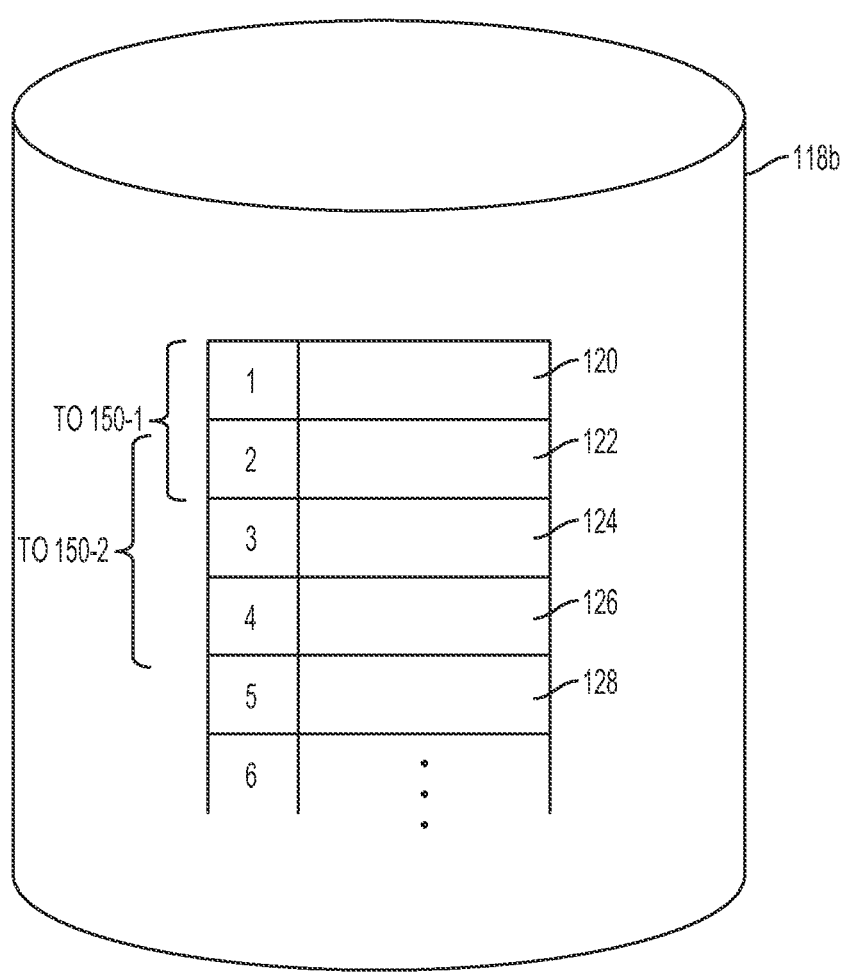
FIG. 3 is a schematic diagram showing selection of portions of content data to be sent from a root node to child nodes, according to an embodiment.

FIG. 3 depicts an example set of pre-fetched content data 120, 122, 124, 126, 128, and so on, as may be stored in data store 118b. Content data in this set are depicted in order of priority, e.g., 1, 2, 3, 4, 5, 6, and so on. As depicted, for this example set of content data, a subset including content data 120 and 122 is selected for transmission to child node 150-1. This subset of content data is expected be required at the user's mobile device 200 when the user is proximate to child node 150-1. Another subset including content data 122, 124, and 126 is selected for transmission to child node 150-2. This subset of content data is expected be required at device 200 when the user is proximate to child node 150-2.

As depicted, although the subsets of pre-fetched content data sent to child nodes 150 may differ, the subsets may overlap. Thus, for example, some pre-fetched content data (e.g., content data 122) may be sent to multiple child nodes. In some cases, the same subset of pre-fetched content data may be sent to multiple child nodes. In some cases, the subset of pre-fetched content data sent to a child node 150 may have no overlap with any subset of pre-fetched content data sent to another child node 150. Further, a child node 150 may pre-fetch additional data.

Consequently, a child node 150 may maintain pre-fetched content data that is unique to that child node 150, or that is identical to data maintained at another child node 150. When the data is unique, it may or may not include data that overlaps with data stored at another child node 150.

Some parts of the content data (e.g., data 128) may be transmitted to no child nodes. Such content data may include, for example, data not expected to be needed at the user's device in the near future.

In an embodiment, content data distribution module 114 may divide large content items into a plurality of portions and transmit portions to multiple child nodes 150, or at separate times (e.g., in separate subsets). Dividing a content item may be desirable, for example, when link capacity or storage capacity at a child node 150 is constrained. The portions of the content item may be transmitted to the device 200 from the multiple child nodes 150. Device 200 may reassemble the content item from received portions, or may use the content item portion by portion (e.g., as may be the case with streaming video). The content item may also be reassembled at a child node 150, e.g., when the portions of the content item are sent at separate times to the same child node 150.

In an embodiment, content data distribution module 114 maintains a record of previous pre-fetched content data sent to each child node 150. In this embodiment, pre-fetch module 110 sends content data updates reflecting new/updated content data. For example, updates may take the form of a data delta or difference from a previous update. In an embodiment, new/updated content data may be compressed before transmission, and may be decompressed at a child node 150 or at mobile device 200.

In an embodiment, parts or all of the pre-fetched content data may also be transmitted directly to the user's mobile device 200.

Upload module 116 is configured to upload user data to interconnected servers. User data may be received from the user's mobile device 200, either directly, or by way of child nodes 150. Received user data may be temporarily stored in upload data store 118c before it is transmitted to an interconnected server. User data may, for example, include data used to obtain access to further content data.

In an embodiment, user data for upload may be provided to mobility prediction module 102, to predict the user's situation/location based on the user data. In an embodiment, user data for upload may be provided to content interest prediction module 104, to predict the user's content interests based on the user data.

In an embodiment, user data for upload may include indicators of content data stored at the mobile device 200. Nodes 100 and 150 may process that data, for example, to identify content that does not need to be transmitted to device 200 and therefore should not be pre-fetched. Indications of content data stored at the mobile device 200 may be shared with other users or devices, for retrieval of content from mobile device 200.

In an embodiment, root node 100 may determine that no child node 150 exists at a location suitably proximate a predicted future location of the user, and may cause a new child node 150 to be instantiated. Content list distribution module 108 may then transmit content list data to the newly instantiated child node. Similarly, content data distribution module 114 may then transmit pre-fetched content data to the newly instantiated child node.

Each of child nodes 150 may be configured to have some or all of the modules and data stores of root node 100, as depicted in FIG. 2.

As noted, each child node 150 maintains its own content list. Each child node may include a content list data store 118a to store content list data. Each node 150 populates data store 118a with content list data and any updates received.

In an embodiment, each child node 150 may include a mobility prediction module to perform mobility prediction in manners similar to root node 100, as described above. A child node 150 may have access to data useful for such prediction that are not available to root node 100, or may have access to such data sooner than root node 100, e.g., by virtue of being located closer to the user, or being made aware of mobility of multiple users in proximity to the child node 150. In one example, a child node 150 may receive sensor data from the user's mobile device 200 before root node 100. In another example, a child node 150 may be able to access local traffic data or local weather data for its particular geographic location. So, in some cases, a child node 150 may able to generate more accurate or more timely user mobility predictions.

In this embodiment, each child node 150 may exchange user mobility prediction updates with root node 100. Such updates may include data for predicting user mobility or any predictions that have been made. In this way, predictions at each node may take advantage of available data relating to user locations or user situations.

In an embodiment, each child node 150 may re-assess the priority of content items in its content list, as received from root node 100. For example, child node 150 may re-assess the priority of content items based on mobility predictions made at that node, and priorities may be updated. The child node 150 may use such re-assessed priorities to determine what parts of the content list or any content data stored at the node are transmitted to other nodes or to device 200, and when.

Data reflective of updated priorities determined by child node 150 may be transmitted to root node 100. Such data may also be sent to device 200.

In an embodiment, each child node 150 may determine updates to its content list. For example, each child node 150 may include a content interest prediction module 102 to identify additional content items that may be of interest to the user, in manners similar to root node 100, as described above. Content interest predictions performed at each child node 150 may take into account any user mobility predictions generated at that child node 150 or otherwise obtained at that child node 150.

Each child node 150 may also include a content finder module 106 to find locations, e.g., including alternate locations, of content items identified in its content list. Each child node 150 may search within a local network neighborhood, for example, in its local cache or in neighboring caching nodes, which may not have been searched by root node 100. So, locations for content items closer to the user may be found.

A child node 150 may send content list updates, e.g., reflecting new predictions or locations, to root node 100. A child node 150 may also send content list updates to mobile device 200.

In an embodiment, a child node 150 includes a pre-fetch module 110 to pre-fetch content data based on its content list, in manners similar to root node 100, as described above. Pre-fetched content data may be stored at the child node 150, e.g., in a content data store 118*b*, for subsequent transmission to mobile device 200. Any pre-fetched content data received from root node 100 may also be stored in content data store 118*b* for subsequent transmission to mobile device 200 or to another node. A child node 150 may pre-fetch particular content data upon receiving a request from root node 100.

Conveniently, in this embodiment, child nodes 150 receive pre-fetched content data from a root node 100. Such data received from root node 100 need not be retrieved by a child node from a remote content data source.

Each child node 150 may assign priorities to pre-fetched content data for subsequent transmission in manners similar to root node 100, as described above. Prioritization at the child node 150 may take into account any user mobility predictions made at that node.

As noted, mobile device 200 may maintain its own content list, and keep this content list synchronized with the content list at root node 100. Mobile device 200 may generate new content list data to reflect interests predicted or otherwise determined at the mobile device, and update its content list accordingly. For example, as the user of mobile device 200 accesses content, mobile device 200 may identify related content items and update its content list to include such related content items.

Mobile device 200 may also search for locations of content items, e.g., in a local cache or within a local area network. Mobile device 200 may include such locations in the content list and update one or more of the nodes (e.g., root node 100 and child nodes 150).

The content list at mobile device 200 may be updated by the user, a user agent, an application executing at device 200. The mobile device may transmit a content list update to one or more of the nodes (e.g., root node 100 and child nodes 150).

In one specific example, a user may be driving a car under icy road conditions. Mobile device 200 may receive data indicating that the user is driving (e.g., from onboard accelerometer or GPS sensor readings) and data indicating local weather conditions. On the basis of this data, mobile device 200 may predict that the user will be interested in particular content, e.g., driving instructions for icy road conditions. Mobile device 200 may assign a high priority to this content item given that the driver is currently driving. This content interest may be updated to child nodes 150 proximate the driver's route.

In another specific example, a soccer player traveling to a soccer tournament may indicate that she is interested in information relating to a particular position or weaknesses of the opposing team. This content interest may be distributed to child nodes 150 proximate the soccer field.

This content interest may trigger the same interest being added to content lists of other users, e.g., by a content interest prediction module 104 servicing those other users. Such other users may, for example, be users having similar interest profiles (e.g., a player who plays the same position) or users in close proximity to the soccer player (e.g., other players traveling to the soccer tournament).

In an embodiment, a mobile device 200 may share its content list with other mobile devices. Such other mobile devices may, for example, be mobile devices operated by friends, family or other trusted users. Such other mobile devices may be interconnected with device 200 by, e.g., a local area network, or a virtual local area network.

Mobile device 200 may share all or part of a content list with particular other users or other devices. For example, a shared part of a content list may relate to specific interest categories. Sharing a content list may facilitate retrieval of content data of interest to a group of users or devices, e.g., by one or more of the members of the group, to be shared amongst the group. Mobile device 200 may share all of part of a content list by way of root node 100 or one or more of child nodes 150.

Figure 4:
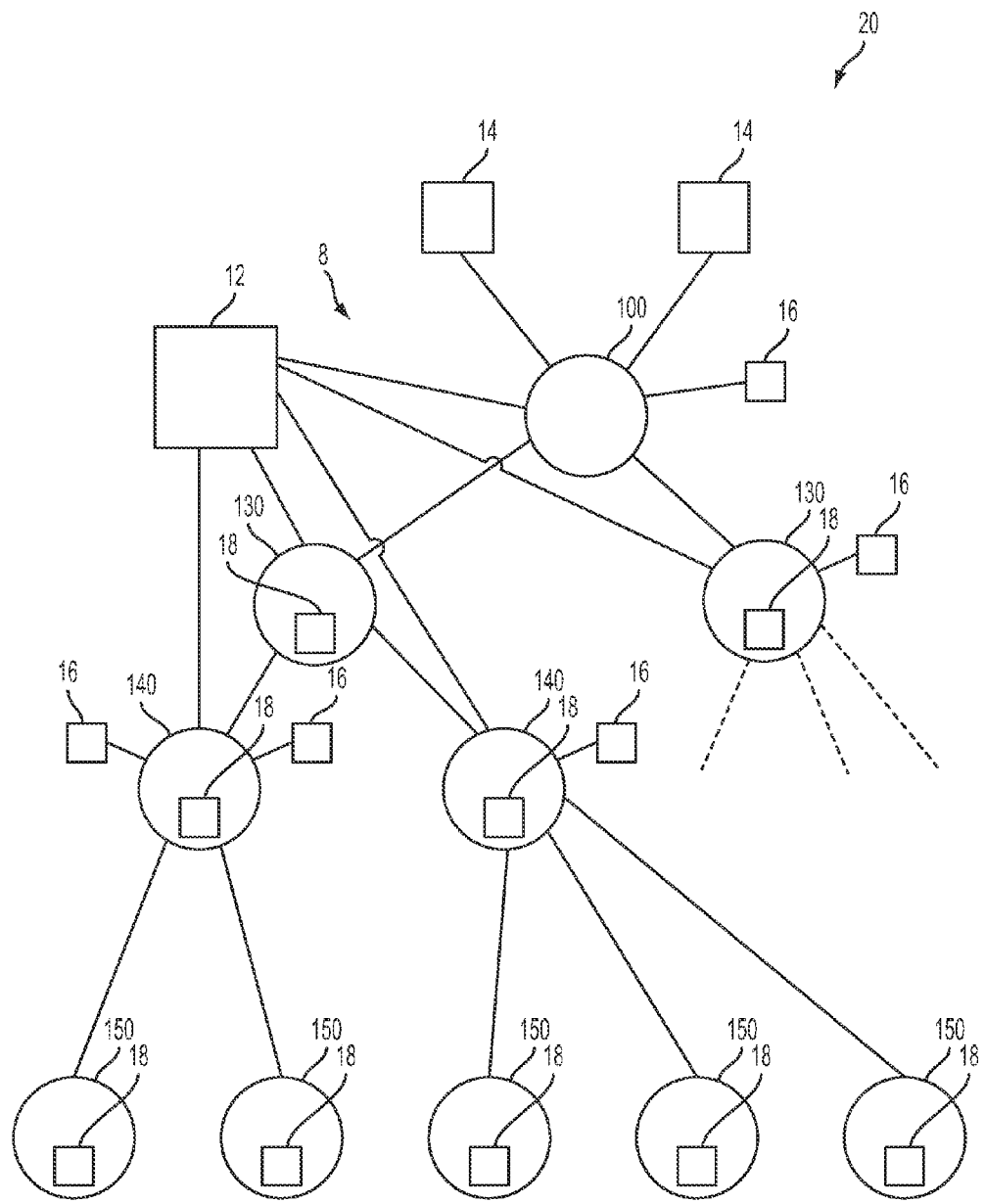
FIG. 4 is a schematic diagram of a data communication system including root nodes and child nodes arranged in a four-level hierarchy, according to an embodiment.

FIG. 4 depicts a data communication system 10, according to another embodiment. Content discovery system 20 differs from content discovery system 10 in that whereas system 10 includes nodes organized hierarchically into two levels (root node 100 at one level, and child nodes 150 below), system 20 includes nodes organized hierarchically into four levels.

In particular, system 20 includes a root node 100, child nodes 130 at a level below the root node 100, child nodes 140 at a level below child nodes 130, and child nodes 150 at a level below child nodes 140. Each of root node 100, child nodes 130, 140, and 150 are interconnected by at least one data communication network 8.

Root node 100 of system 20 may function in manners substantially similar to that described above for root node 100 of system 10. Each of child nodes 130, 140, and 150 may function in manners substantially similar to that described above for child node 150 system 10.

However, unlike in system 10, root node 100 does not send pre-fetched content data, i.e., content data updates, directly to child node 150. Rather, root node 100 transmits content data updates to child nodes 130; each child node 130 sends content data updates to its interconnected child nodes 140; each child node 140 sends content data updates to its interconnected child nodes 150. Finally, child node 150 may transmit content data updates to mobile device 200.

Further, unlike in system 10, root node 100 does not exchange data (e.g., content list updates, content list priority updates, user mobility prediction updates) directly with child node 150. Rather, root node 100 exchanges such data with child nodes 130; each child node 130 exchanges such data with its interconnected child nodes 140; each child node 140 exchanges such data with its interconnected child nodes 150. Finally, each child node 150 may exchange such data with device 200.

Figure 5:
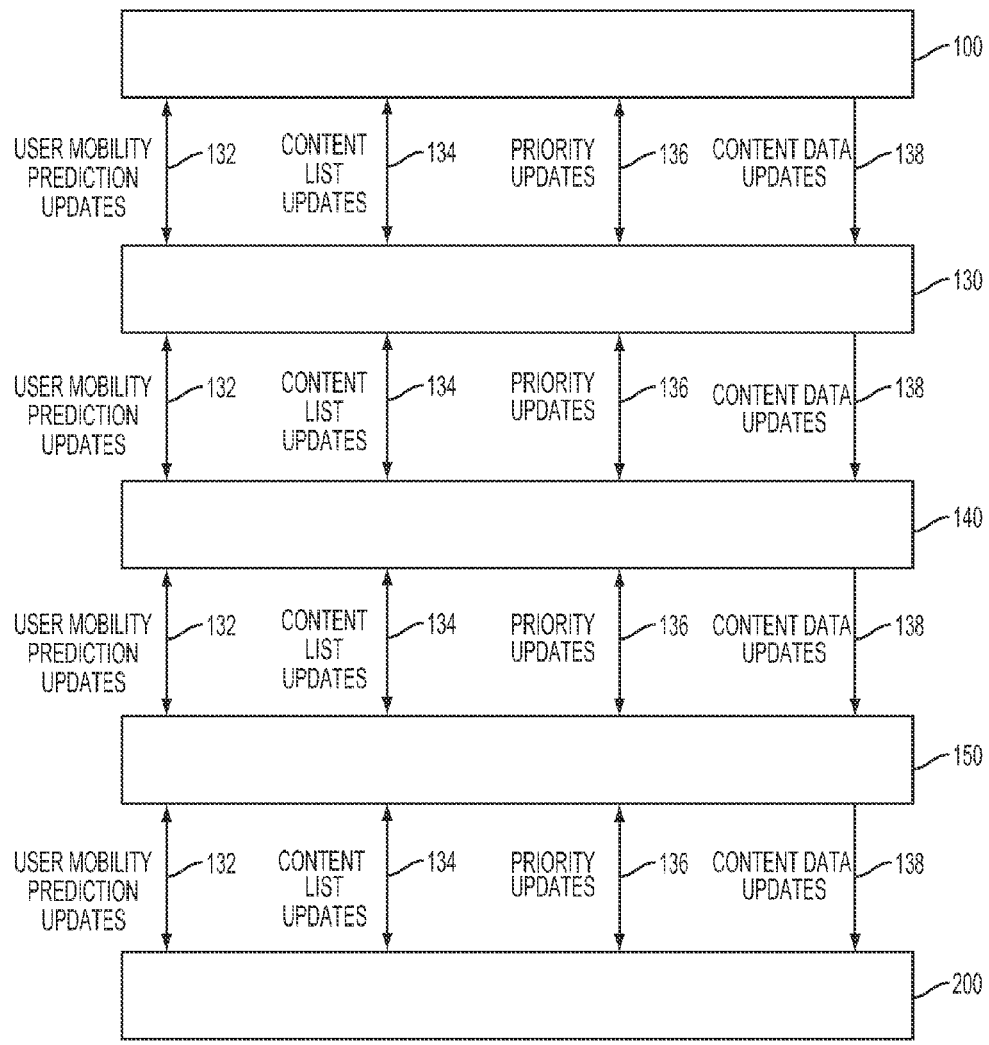
FIG. 5 is a data-flow diagram showing exchange of data between root nodes and child nodes in the system of FIG. 4, according to an embodiment.

FIG. 5 illustrates the propagation of content data updates 138 for pre-fetched content data down the node hierarchy of system 20 towards predicted future locations of mobile device 200. Similarly, FIG. 5 illustrates example propagation of user mobility prediction updates 132, content list updates 134, and content list priority updates 136, up and down the node hierarchy of system 20 towards predicted future locations of mobile device 200.

Nodes in descending levels of the hierarchy may have progressively smaller geographic scope of responsibility. For example, while root node 100 may maintain pre-fetched content data for any content item expected to be of interest to the particular user, a node 130 may maintain pre-fetched content data relevant for an assigned geographic region that the user is expected to move within or travel through. So, root node 100 selects a portion of its pre-fetched content data for transmission to a node 130 that includes content data expected to be needed at device 200 while the user is within the geographic region assigned to that node 130. The limited geographic scope of a node 130 may also limit the temporal scope of the pre-fetched content data maintained at the node 130. For example, node 130 may maintain pre-fetched content data that is expected to be needed at device 200 during the time period that the user is expected to be within the geographic region assigned to node 130.

Moving down the hierarchy, each node 140 may maintain pre-fetched content data relevant for a subregion of the region assigned to its parent node 130. So, a node 130 selects a portion of its pre-fetched content data for transmission to a node 140 that includes content data expected to be needed at device 200 while the user is within the subregion assigned to that node 140. Each node 150 may maintain pre-fetched content data relevant for an even smaller geographic area that is part of the subregion assigned to its parent node 140. So, a node 140 selects a portion of its pre-fetched content data for transmission to a node 150 that includes content data expected to be needed at device 200 while the user is within the area assigned to that node 150.

Nodes in descending levels of the hierarchy may be progressively closer to the user's location. Thus, nodes at each descending level may have access to data for making more accurate or more timely user mobility predictions, and may be able to perform more accurate prioritization of content items and/or pre-fetched content data. As shown in FIG. 5, user mobility prediction updates and priority updates may be propagated from the lower levels upwards.

Nodes at each level of the hierarchy may cause a new node in a level below it to be instantiated to provide a new node at a location corresponding to a predicted future location of the user. Similarly, nodes at each level of the hierarchy may cause a node in a level below it to be deactivated or removed when it is no longer required.

As depicted, each of nodes 100, 130, and 140 is interconnected with one or more traffic controllers 12. Additionally, each node 150 may be interconnected with one or more traffic controllers 12. Each traffic controller 12 is configured to perform traffic engineering functions to control the transmission of traffic (e.g., routing and scheduling) in a respective data communication network 8. So, transmission of traffic in system 100, e.g., between nodes, or from nodes to a user's mobile device, is controlled by the one or more traffic controllers 12, and transmission requests are sent to the one or more traffic controllers 12. In an embodiment, one or more of nodes 100, 130, 140, and 150 may be not connected with a traffic controller 12, and transmission of traffic for such nodes may be controlled by the node itself or controlled by another controller (e.g., at another node). In an embodiment, a traffic controller 12 may be a Software-Defined Networking (SDN) controller. In an embodiment, a traffic controller 12 may be another type of network controller.

Each of nodes 100, 130, 140, and 150 may be optionally interconnected with one or more cache nodes 16 by way of one or more data communication networks 8. Each of nodes 100, 130, 140, and 150 may optionally include one or more local caches 18. Caching nodes 16 and local caches 18 may each contain cached content data. The cached content data may, for example, be data accessed in the past by the particular user, or other users. The cached content data may, for example, be data frequently accessed e.g., in a particular geographic region or in a particular network 8. Nodes may search within cache nodes 16 and local caches 18 to identify content items of interest, or to find locations for identified content items. Content may be pre-fetched from any of these cache nodes 16 or local caches 18.

In an embodiment, each of nodes 100, 130, 140, and 150 may function as a virtualized version of mobile device 200, and present itself as mobile device 200 to network components, e.g., traffic controller 12. In one specific example, a node may present itself as mobile device 200 in order to obtain authorized access to network resources on behalf of mobile device 200. In another specific example, a node may track aspects of the state of mobile device 200, e.g., its power level, and distance from a power source. Such information may be used, for example, to change the priority of particular content data or particular content list data to be transmitted to the device.

In an embodiment, each of nodes 100, 130, 140, and 150 may be associated with other network functionalities, which may be assigned based on the level of that node in the hierarchy. For example, nodes 130 may function as regional connectivity managers that facilitate tracking of a mobile device 200, and interact with traffic controller 12 on behalf of mobile device 200. For example, nodes 140 may function as local connectivity managers. Nodes 140 may also function as default gateways for the mobile device 200. So, node 140 may maintain data regarding future routing demands of device 200, e.g., based on content data that has been pre-fetched and is expected to be transmitted to device 200. Such routing demands may be provided to traffic controller 12.

Like the nodes 150, the nodes 130 and/or 140 may be instantiated to service a geographical area that varies according to a particular user's location. For example, this geographical area may migrate with the particular user as that user moves from location to location.

In one specific example, a node 100 may be located in the cloud. A particular node 130 may be instantiated in the particular user's home city, e.g., at a regional gateway. A particular node 140 may be instantiated proximate the user's home, e.g., when the user is at home. Another node 140 may instantiated proximate the user's work, e.g., when the user is at work. When the user moves throughout the city, node 130 may be maintained in position, and new nodes 140 and 150 may be instantiated at various locations proximate to the user's changing locations. When the user leaves the city, e.g., by way of an airplane, a new node 130 may be instantiated, e.g., at a satellite, to serve the user while in transit. Nodes 140 and 150 may, for example, be instantiated within the airplane. When the user arrives at a new city, a new node 130 may be instantiated for the user in that new city. Similarly, new nodes 140 and 150 may also be instantiated for the user in the new city. New nodes 140 and 150 may be instantiated to service a geographical area that varies according to the user's particular location in the new city.

Each of nodes 130, 140, 150 may be referred to herein as child nodes of root node 100. However, a node 140 may also be referred to as a child node of a node 130, and a grandchild node of root node 100. Similarly, a node 150 may also be referred to as a child node of a node 140, a grandchild node of a node 130, and a great grandchild node of root node 100. Conversely, each of nodes 100, 130, and 140 may be referred to as a parent node, grandparent node, or great grandparent node of their respective child nodes, grandchild nodes, and great grandchild nodes.

Nodes organized hierarchically into two levels and four levels have been shown in the depicted embodiments. However, in other embodiment, there may be a fewer or greater number of levels.

Further, in the depicted embodiments, the nodes are interconnected according to a tree topology. However, in other embodiments, the nodes may be interconnected according to a different topology (e.g., mesh topology). For example, each child node may be interconnected with multiple parent nodes, and may exchange data (e.g., content list updates, user mobility prediction updates, content data updates, etc.) with each of those parent nodes. Further, each child node may be interconnected with other child nodes at the same level of the hierarchy (e.g., its sibling nodes), such that data may be exchanged between child nodes. In an embodiment, the nodes of system 10 may be interconnected such that subsets of the nodes are arranged according to different topologies.

In some embodiments, information generated or obtained by system 10 or mobile device 200, e.g., user mobility predictions, alternate locations of data, network transmission characteristics, when data is expected to be needed, etc., may be provided to traffic controller 12. Traffic controller 12 may take into account all such information to route and schedule data traffic.

In some embodiments, storage and transmission of content interests and content data may take into account security requirements, e.g., to protect confidential information or privacy. Such requirements may be specified, e.g., for each content item, or each type of content item. For example, a high level of security may be specified for content items including sensitive data such as, for example, personal photographs or bank statements. Conversely, a low level of security may be specified for publically available data such as, e.g., weather reports. Security requirements may be included in the content list, in association with particular content items.

Portions of content lists or content data may also be classified according to their purpose, e.g., personal or work, and different security requirements may be specified based on this purpose.

Portions of content lists or content data may be stored in particular locations and/or transmitted by way of particular links, depending on security requirements. For example, portions of content lists or content data associated with a user's work may be stored in a secured corporate server, and may be transmitted by way of secured VPN links.

In an embodiment, nodes may be instantiated at particular locations at least partly based on security requirements, e.g., using particular secured hardware or at particular secured network locations. In an embodiment, subsets of content lists and/or subsets of content data may be selected at least partly based on security requirements, e.g., for transmission to particular secured hardware or to particular secured network locations.

Content lists and content data may be encrypted during transmission and/or storage.

The operation of the data communication systems disclosed herein may be further described with reference to the flowcharts depicted in FIG. 6, FIG. 7, and FIG. 8.

Figure 6:
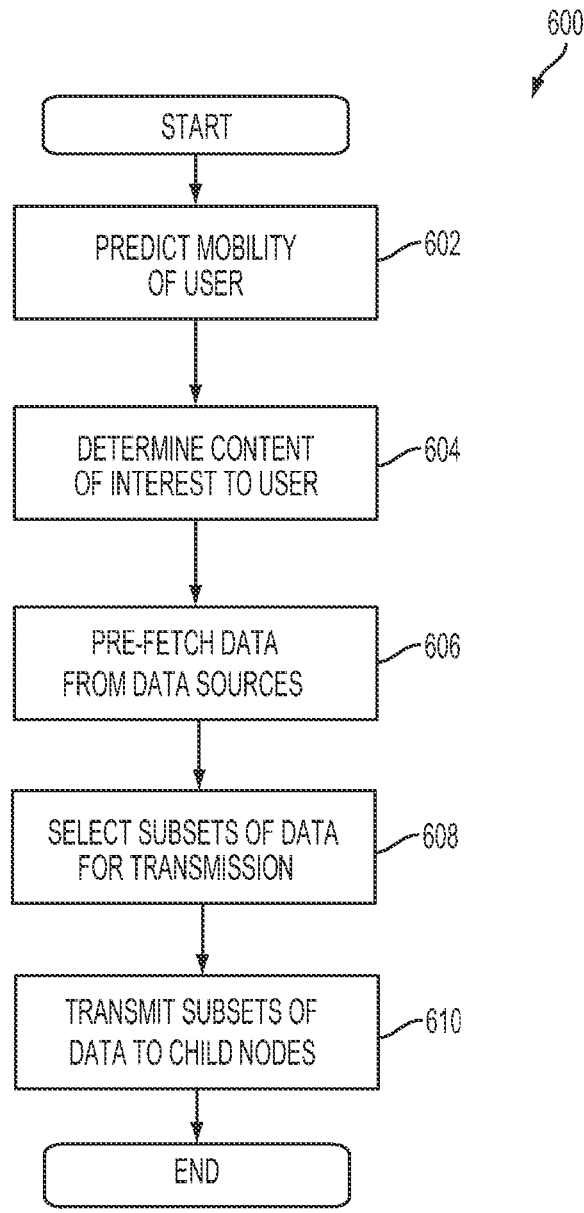
FIG. 6 and FIG. 7 are flowcharts showing example operation at a root node, according to an embodiment.

FIG. 6 depicts an example method 600 that may be performed at a root node 100 or at any parent node to distribute data pre-fetched at the root node 100 for a particular user, and content list data including identifiers of data expected to be of interest to the particular user, e.g., for pre-fetching at a child node. This data pre-fetched at root node 100 and the content list data may be referred to collectively as pre-fetch data. As will be appreciated, the order of the blocks is shown as an example only, and blocks may be performed in other suitable orders.

As depicted, operation begins at block 602. At block 602, root node 100 performs user mobility prediction for a particular user, in manners described above.

At blocks 604 and 606, root node 100 obtains pre-fetch data for distributing to child nodes. In particular, at root node 100 performs content interest prediction to determine content expected to be of interest to the particular user. For example, root node 100 may generate content list data including one or more identifiers identifying data expected to be of interest to the particular user. In another embodiment, root node 100 may simply receive a list of content expected to be of interest to the user from an external entity, such that content interest prediction at the root node 100 may be omitted.

At block 606, root node 100 optionally pre-fetches content expected to be of interest to the particular user from at least one content data source, e.g., by way of at least one network 8.

At block 608, root node 100 selects subset(s) of the pre-fetch data to be transmitted to one or more of the child nodes. For example, root node 100 may select a first subset of the pre-fetch data to be transmitted to a first child node, and select a second subset of the pre-fetch data to be transmitted to a second child node. Each subset may be selected in the manners described above. For example, a subset to be sent to a child node may be selected based on at least a predicted future location of the user, and the geographic location of that child node. The selected subsets of the pre-fetch data are then transmitted to the each of the respective child nodes.

Figure 7:
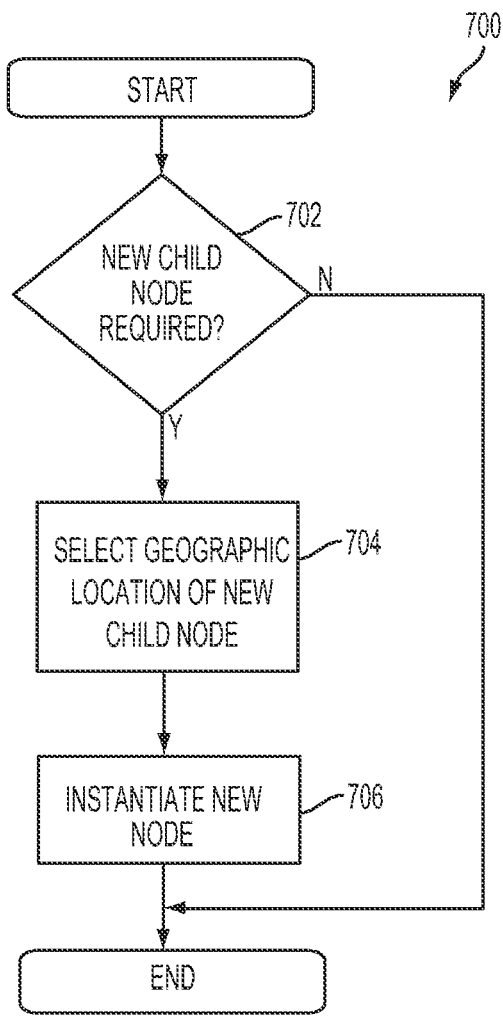

FIG. 7 depicts an example method 700 that may be performed at a root node 100 or at any parent node to instantiate a new child node (e.g., a child node 130, 140, or 150). As depicted, operation begins at block 702.

At block 702, root node 100 determines whether a new child node is required, e.g., based on a prediction of a future location of the user. The prediction of the future location of the user may be, for example, obtained by root node 100 by performing user mobility prediction at block 602 (FIG. 6), or received from device 200. A new child node may be determined to be required, for example, if there are no existing child nodes proximate the predicted future location. If a new child node is required, at block 704, a desired geographic location of the new child node is selected based on the prediction of the future location of the user, e.g., to be proximate the predicted future location. Selection of the geographic location of the new child node is also based on the locations of devices available to function as the new child node. At block 706, a new child node is instantiated at the selected geographic location. For example, root node 100 may transmit a request to a device at the selected geographic location to function as the new child node.

Method 700 may be performed at root node 100 before, following, or in parallel with any of blocks 600 depicted in FIG. 6. For example, a new child node may be instantiated before, after, or during pre-fetching of content data.

One or more of method 600 or method 700 described above may be repeated at root node 100, e.g., as new content data needs to be pre-fetched, or as a user's location changes, or as a user's predicted future location changes.

Figure 8:
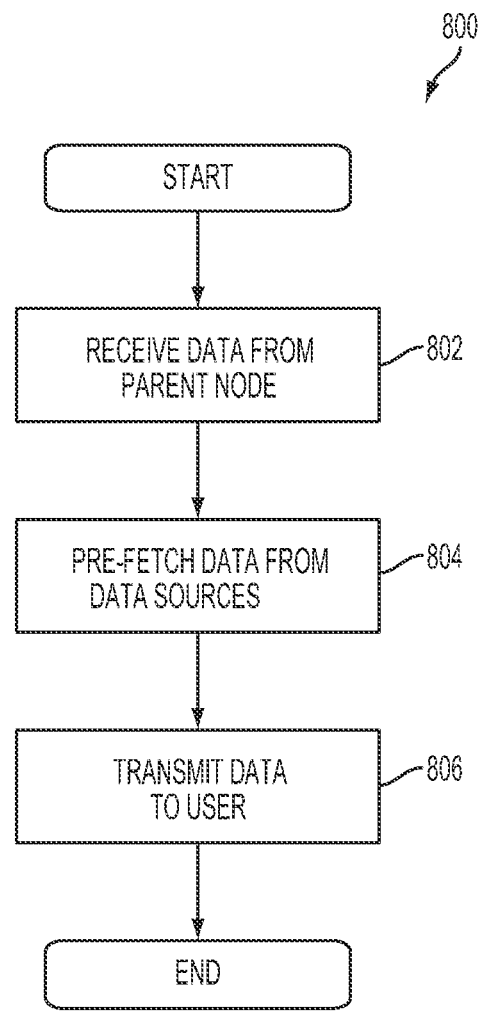
FIG. 8 is a flowchart showing example operation at a child node, according to an embodiment.

FIG. 8 depicts an example method 800 that may be performed at a child node (e.g., a child node 130, 140, or 150). As depicted, operation begins at block 802. At block 802, the child node receives pre-fetched content data from its root node (e.g., root node 100).

At block 804, the child node may, optionally, pre-fetch additional content data from one or more content data sources, by way of at least one network 8.

In some cases, the child node may identify content expected to be of interest to the particular user, e.g., by performing content interest prediction, and then may pre-fetch additional content data based on content that it has identified.

In other cases, the child node may receive an identifier identifying content expected to be of interest from the parent node. The identifier may be included in the content list provided to the child node. The identifier may also be included in a request sent by the parent node to pre-fetch particular content data.

In yet other cases, the child node may receive from mobile device 200 an identifier identifying content expected to be of interest from mobile device 200. The identifier may be included in the content list provided to the child node. The identifier may also be included in a request sent by device 200 to pre-fetch particular content data.

At block 806, some or all of the pre-fetched data is transmitted to mobile device 200.

One or more of the blocks described above may be repeated at the child node, e.g., as new pre-fetched content data is received from the parent node.

As will be appreciated, the flowcharts depicted in FIG. 6, FIG. 7, and FIG. 8 each show simplified example operation of the systems described herein, and other details (e.g., prediction of user situation, exchange of content list data, uploading of data, etc.) have been omitted for clarity. The systems may operate in these and other manners.

Although embodiments have been described in the foregoing with reference to mobile devices, the systems, methods and devices disclosed herein may be applied to all manner of devices, e.g., vehicles, robots, machines, sensors, televisions, desktop computers, etc. Such devices need not be mobile. Such devices may be integrated with other devices or equipment.

Although embodiments have been described in the foregoing with reference to example nodes having particular functionality, it will be appreciated that in some embodiments, the functionality described for one example node may be distributed over multiple nodes, which may each be implemented in hardware, software, or a combination thereof. In some embodiments, multiples nodes may be implemented using shared hardware or software.

Embodiments have been described in the foregoing with reference to a user. As will be appreciated, in some embodiments, the user need not be a human being. Rather, the user may, for example, be a device, a machine, or a software application.

In one specific example, the user may be a robot, and content of interest for the robot may relate to potential kinematic designs. Such content may be retrieved by the robot, for example, to plan upcoming movements.

In another specific example, the user may be a controller for an electronic billboard, and content of interest may be advertisements. Such content may be retrieved, for example, in response to the presence of particular users.

In another specific example, the user may be a controller for a self-driving vehicle, and content of interest may be road conditions. Such content may be retrieved, for example, to adapt to such road conditions.

Figure 9:
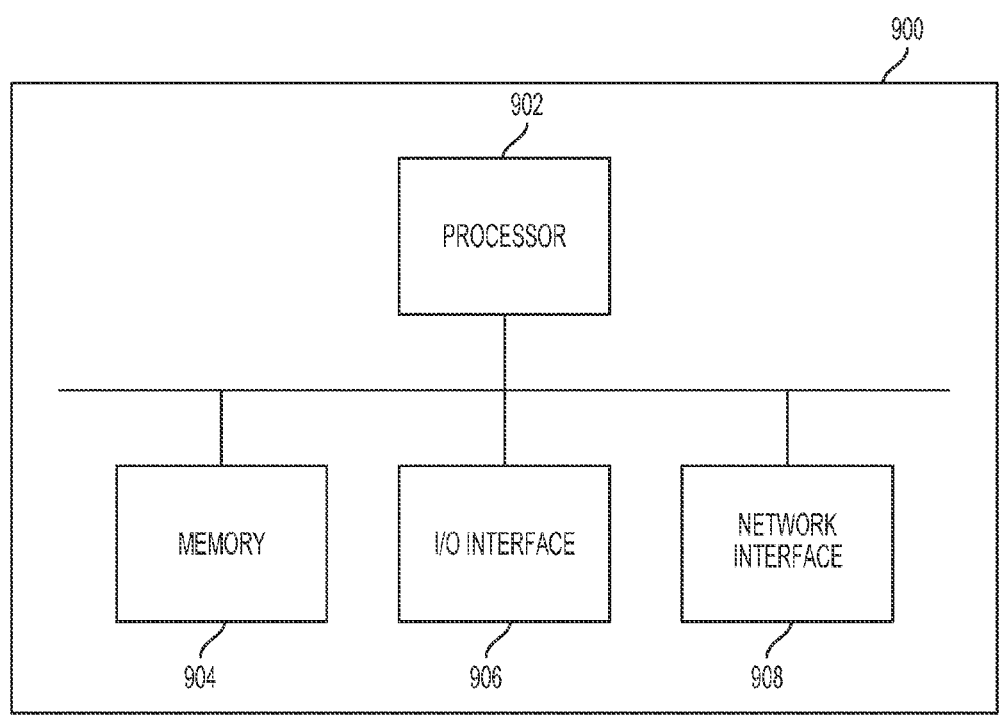
FIG. 9 is a high-level block diagram of an example device for implementing nodes, according to an embodiment.

FIG. 9 is a schematic diagram of an example computing device 900 that may be adapted to function as any of the nodes described herein. The computing device may be any network-enabled computing device such as, e.g., a server-class computer, or a personal computer, a router, a switch, an access point, etc.

In the depicted embodiment, computing device 900 includes at least one processor 902, memory 904, at least one I/O interface 906, and at least one network interface 908.

Processor 902 may be any type of processor, such as, for example, any type of general-purpose microprocessor or microcontroller (e.g., an Intel™ x86, PowerPC™, ARM™ processor, or the like), a digital signal processing (DSP) processor, an integrated circuit, a field programmable gate array (FPGA), or any combination thereof.

Memory 904 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), flash memory, or the like.

I/O interface 906 enables device 900 to interconnect with input and output devices, e.g., peripheral devices or external storage devices.

Network interface 908 enables device 900 to communicate with other components, e.g., other nodes, and perform other computing applications by connecting to a network such as one or more of networks 8.

Embodiments disclosed herein may be implemented by using hardware only or by using software and a necessary universal hardware platform. Based on such understandings, the technical solution may be embodied in the form of a software product. The software product may be stored in a non-volatile or non-transitory storage medium, which can be a compact disk read-only memory (CD-ROM), USB flash disk, a solid-state drive, or a removable hard disk. The software product includes a number of instructions that enable a computer device (personal computer, server, or network device) to execute the methods provided in the embodiments.

Program code, which may be stored in memory 904, may be applied to input data to perform the functions described herein and to generate output information. The output information may be applied to one or more output devices. In some embodiments, the communication interface with such output devices may be a network communication interface (e.g., interface 908). In embodiments in which elements may be combined, the communication interface may be a software communication interface, such as those for inter-process communication. In still other embodiments, there may be a combination of communication interfaces implemented as hardware, software, and combination thereof.

Each computer program may be stored on a storage media or a device (e.g., ROM, magnetic disk, optical disc, solid-state drive), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the systems and methods of the described embodiments are capable of being distributed in a computer program product including a physical, non-transitory computer readable medium that bears computer usable instructions for one or more processors. The medium may be provided in various forms, including magnetic and electronic storage media, such as one or more diskettes, compact disks, tapes, chips, or the like. The medium may be configured to provide memory that is volatile or non-volatile. Non-transitory computer-readable media may include all computer-readable media, with the exception being a transitory, propagating signal. The term non-transitory is not intended to exclude computer readable media such as primary memory, volatile memory, RAM and so on, where the data stored thereon may only be temporarily stored. The computer useable instructions may also be in various forms, including compiled and non-compiled code.

It will be noted that servers, services, interfaces, portals, platforms, or other systems formed from hardware devices can be used. It should be appreciated that the use of such terms is deemed to represent one or more devices having at least one processor configured to execute software instructions stored on a computer readable tangible, non-transitory medium. One should further appreciate the disclosed computer-based algorithms, processes, methods, or other types of instruction sets can be embodied as a computer program product comprising a non-transitory, tangible computer readable media storing the instructions that cause a processor to execute the disclosed steps.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

The embodiments described herein are implemented by physical computer hardware embodiments. The embodiments described herein provide useful physical machines and particularly configured computer hardware arrangements of computing devices, servers, processors, memory, networks, for example. The embodiments described herein, for example, are directed to computer apparatuses, and methods implemented by computers through the processing and transformation of electronic data signals.

The embodiments described herein may involve computing devices, servers, receivers, transmitters, processors, memory, display, networks particularly configured to implement various acts. The embodiments described herein are directed to electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, a various hardware components.

Substituting the computing devices, servers, receivers, transmitters, processors, memory, display, or networks particularly configured to implement various acts for non-physical hardware, using mental steps for example, may substantially affect the way the embodiments work.

Such hardware limitations are clearly essential elements of the embodiments described herein, and they cannot be omitted or substituted for mental means without having a material effect on the operation and structure of the embodiments described herein. The hardware is essential to the embodiments described herein and is not merely used to perform steps expeditiously and in an efficient manner.

Although the present invention and its advantages have been described in detail, it should be understood that various changes, substitutions and alterations can be made herein without departing from the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

As can be understood, the embodiments described above and illustrated are intended to be examples only. The scope is indicated by the appended claims.

What is claimed is:

1. A method at a parent node for distributing pre-fetch data to at least two child nodes, the method comprising:
    obtaining pre-fetch data comprising at least one of:
        (i) data expected to be of interest to a particular user, pre-fetched by the parent node from at least one data source by way of at least one data network; and
        (ii) at least one identifier identifying data expected to be of interest to the particular user, for pre-fetching the identified data at at least one of the child nodes;

obtaining a predicted trajectory for said particular user, the predicted trajectory defining a first predicted time and location; and a second predicted time and location;

selecting a first subset of the pre-fetch data for transmission to a first child node proximate the first location and a second subset of the pre-fetch data, different than the first subset, for transmission to a second child node proximate the second location, the selecting based on at least the first time and location and the second time and location; and transmitting the first subset and the second subset of the pre-fetch data, respectively, to the first child node and the second child node by way of the at least one data network.

2. The method of claim 1, further comprising: selecting a desired location as the geographic location of a given one of the first and second child nodes based on at least the predicted trajectory of the particular user.

3. The method of claim 2, further comprising: transmitting a request to a device at the desired location to function as the given one of the first and second child nodes.

4. The method of claim 1, further comprising: determining when previously pre-fetched data is updated at the at least one data source.

5. The method of claim 4, further comprising: pre-fetching the updated data and transmitting the updated data to at least one of the child nodes.

6. The method of claim 4, further comprising: transmitting a request to at least one of the child nodes to pre-fetch the updated data.

7. The method of claim 1, further comprising:
receiving an identifier identifying data expected to be of interest to the particular user from a device operated by the particular user; and
pre-fetching the identified data using the received identifier from at least one data source by way of the at least one data network.

8. The method of claim 1, further comprising: establishing an authorized connection with the at least one data source.

9. The method of claim 1, further comprising: generating predictions of data expected to be of interest to the particular user.

10. The method of claim 1, wherein the selecting is based on a numerical likelihood of particular portions of the pre-fetch data being of interest to the particular user.

11. The method of claim 1, wherein the selecting is based on at least one of: network transmission characteristics associated with data communication with at least one of the child nodes, a prediction of how soon data will be needed, content quantity, user cost preferences, traffic associated with other users, and data security requirements.

12. The method of claim 11, wherein the network transmission characteristics comprise at least one of: a data rate, a latency, a capacity, a congestion state, and a cost.

13. The method of claim 1, wherein the at least one data source includes a cache, and the data pre-fetched at the parent node comprises data cached at the at least one data source.

14. A network node for distributing pre-fetch data, the node comprising:
a network interface for interconnection with at least two child nodes by at least one data network; and
at least one processor in communication with the network interface, the at least one processor configured to:
obtain pre-fetch data comprising at least one of:

(i) data expected to be of interest to a particular user, pre-fetched by the network node from at least one data source by way of the network interface; and
(ii) at least one identifier identifying data expected to be of interest to the particular user, for pre-fetching the identified data at at least one of the child nodes;
obtain a predicted trajectory for said particular user, the predicted trajectory defining a first predicted time and location; and a second predicted time and location;
select a first subset of the pre-fetch data for transmission to a first child node proximate the first location and a second subset of the pre-fetch data for transmission to a second child node proximate the second location, the selecting based on at least the first time and location and the second time and location; and
transmit, by way of the network interface, the first subset and the second subset of the pre-fetch data, respectively, to the first child node and the second child node.

15. The network node of claim 14, wherein the at least one processor is configured to select a desired location as the geographic location of a given one of the first and second child nodes based on at least the predicted trajectory of the particular user.

16. The network node of claim 15, wherein the at least one processor is configured to transmit, by way of the network interface, a request to a device at the desired location to function as the given one of the first and second child nodes.

17. The network node of claim 14, wherein the at least one processor is configured to determine when previously pre-fetched data is updated at the at least one data source.

18. The network node of claim 17, wherein the at least one processor is configured to pre-fetch the updated data and transmit the updated data to at least one of the child nodes.

19. The network node of claim 17, wherein the at least one processor is configured to transmit a request to at least one of the child nodes to pre-fetch the updated data.

20. The network node of claim 14, wherein the at least one processor is configured to:
receive an identifier identifying data expected to be of interest to the particular user from a device operated by the particular user; and
pre-fetch the identified data using the received identifier from at least one data source by way of the at least one network interface.

21. The network node of claim 14, wherein the at least one processor is configured to establish an authorized connection with the at least one data source.

22. The network node of claim 14, wherein the at least one processor is configured to generate predictions of data expected to be of interest to the particular user.

23. The network node of claim 14, wherein the selecting is based on a numerical likelihood of particular portions of the pre-fetch data being of interest to the particular user.

24. The network node of claim 14, wherein the selecting is based on at least one of: network transmission characteristics associated with data communication with at least one of the child nodes, a prediction of how soon data will be needed, content quantity, user cost preferences, traffic associated with other users, and data security requirements.

25. The network node of claim 24, wherein the network transmission characteristics comprise at least one of: a data rate, a latency, a capacity, a congestion state, and a cost.

26. The network node of claim 14, wherein the at least one data source includes a cache, and the data pre-fetched at the network node comprises data cached at the at least one data source.

* * * * *